(12) United States Patent
Seo et al.

(10) Patent No.: US 6,538,971 B2
(45) Date of Patent: *Mar. 25, 2003

(54) OPTICAL INFORMATION RECORDING/ REPRODUCING APPARATUS AND METHOD FOR USING BOTH DISC CARTRIDGES HOLDING 8CM AND 12CM DISC

(75) Inventors: Young-sun Seo, Sungman (KR); Hao-kook Choi, Suwon (KR); In-sik Park, Suwon (KR); Myoung-jong Song, Suwon (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/218,164

(22) Filed: Dec. 22, 1998

(65) Prior Publication Data

US 2002/0097657 A1 Jul. 25, 2002

(30) Foreign Application Priority Data

Dec. 23, 1997 (KR) .............................................. 97-72622
May 23, 1998 (KR) .............................................. 98-18685
Apr. 25, 1998 (KR) .............................................. 98-14877

(51) Int. Cl.[7] .............................................. G11B 33/02
(52) U.S. Cl. ...................................... 369/77.2; 369/188
(58) Field of Search .......................... 360/99.08, 99.01, 360/99.02, 99.05, 99.06, 99.11, 99.12; 369/77.2, 275.3, 75.2, 188; 206/307.1, 308.1, 308.3; 386/120

(56) References Cited

U.S. PATENT DOCUMENTS

| | | | |
|---|---|---|---|
| 4,995,029 A | * 2/1991 | Kobayashi et al. | 360/132 |
| 5,226,032 A | * 7/1993 | Ikedo et al. | 369/178 |
| 5,361,181 A | * 11/1994 | Kurata | 360/99.02 |
| 5,610,890 A | * 3/1997 | Eum et al. | 369/77.2 |
| 5,636,200 A | * 6/1997 | Taira et al. | 369/275.3 |
| 5,724,332 A | * 3/1998 | Ogusu | 369/77.2 |
| 5,732,063 A | * 3/1998 | Chen | 369/263 |
| 5,831,958 A | * 11/1998 | Kurita | 369/77.2 |
| 5,867,476 A | * 2/1999 | Yoshida et al. | 369/289 |
| 5,907,535 A | * 5/1999 | Takahashi et al. | 369/291 |
| 5,933,400 A | * 8/1999 | Kabasawa | 369/77.2 |
| 6,002,556 A | * 12/1999 | Oishi | 360/133 |
| 6,052,510 A | * 4/2000 | Sakaegi et al. | 386/120 |

FOREIGN PATENT DOCUMENTS

| | | |
|---|---|---|
| JP | 61-233465 | 10/1986 |
| JP | 2-134767 | 5/1990 |
| JP | 5-144165 | 6/1993 |
| JP | 5-234225 | 9/1993 |
| JP | 8-106709 | 4/1996 |
| JP | 9-91821 | 4/1997 |
| JP | 9-91822 | * 4/1997 |

* cited by examiner

Primary Examiner—Brian E. Miller
Assistant Examiner—Tianjie Chen
(74) Attorney, Agent, or Firm—Staas & Halsey LLP

(57) ABSTRACT

An optical recording/reproducing apparatus capable of using disc cartridges of at least two different sizes and/or a naked disc, on only one tray. The optical recording/reproducing apparatus is also capable of recording and/or reproducing information on/from one of the discs mounted on the tray by automatically detecting the disc cartridges and/or the naked disc positioned on the tray. The optical recording/reproducing apparatus has a case, a tray mounted to the case capable of being received and withdrawn into/from the case, and selectively accommodating disc cartridges of at least two different sizes, a support to support the disc cartridges positioned on the tray according to the size of the disc cartridges, a detection unit to detect the sizes of the disc cartridges positioned on the tray and the state of the discs accommodated in the disc cartridges, a rotating unit to rotate the discs in the disc cartridges positioned on the tray, and a recording/reproducing unit to record information on and/or reproduce the information from the discs rotated by the rotating unit.

38 Claims, 13 Drawing Sheets

OPTICAL INFORMATION RECORDING/ REPRODUCING APPARATUS AND METHOD FOR USING BOTH DISC CARTRIDGES HOLDING 8CM AND 12CM DISC

CROSS-REFERENCE TO RELATED APPLICATIONS

This application claims the benefit of Korean Application Nos. 97-72622, filed Dec. 23, 1997; 98-14877, filed Apr. 25, 1998; and 98-18685, filed May 23, 1998, in the Korean Patent Office, the disclosures of which are incorporated herein by reference.

BACKGROUND OF THE INVENTION

1. Field of the Invention

The present invention relates to an optical recording/ reproducing optical apparatus and method thereof, capable of using disc cartridges of difference sizes, i.e., one of which holds a disc having a diameter of 12 cm, and another one which holds a disc having a diameter of 8 cm, by positioning the disc cartridges on one tray.

2. Description of the Related Art

Generally, there are two kinds of disc cartridges for accommodating discs of different sizes, i.e., one which holds a disc having a diameter of 12 cm (hereinafter called a 12 cm disc cartridge), and another one which holds a disc having a diameter of 8 cm (hereinafter called a 8 cm disc cartridge or a smaller cartridge). Such disc cartridges have an accommodating hole through which a turn table, and a chucking clamp of an optical recording/reproducing apparatus are advanced. The accommodating hole communicates with an opening which serves as a feeding passage to an optical pickup device. A shutter is mounted on each disc cartridge to open/close both the accommodating hole and the opening.

The optical recording/reproducing apparatus has means for rotating the disc at a speed that the information can be recorded/reproduced thereon/therefrom, an optical pickup device moved in a radial direction of the rotating disc while radiating a laser beam on the disc, and a signal processing section for processing the information detected by the laser beam radiated from the optical pickup device.

Thus, when the disc cartridge is advanced in the optical recording/reproducing apparatus, the shutter of the disc cartridge is moved in a direction so that the shutter exposes the accommodating hole and the opening of the disc cartridge. Then, the turn table and the chucking clamp are advanced through the accommodating hole to position and chuck the disc. Continuously, the optical pickup device is linearly and reciprocally moved in a radial direction of the disc (mounted in the disc cartridge) along the opening while recording/reproducing the information on/from the disc.

However, since the conventional optical recording/ reproducing apparatus is capable of using only one kind of disc cartridge, there is a problem in compatibility, i.e., both of the 12 cm and 8 cm discs cannot be used therein.

Further, if both 12 cm and 8 cm discs are to be used, respective optical recording/reproducing apparatuses for the respective disc cartridges have to be provided, and as a result, the cost accordingly increases.

SUMMARY OF THE INVENTION

The present invention has been made to overcome the above-described problems, and accordingly, it is an object of the present invention to provide an optical recording/ reproducing apparatus capable of using a 12 cm disc cartridge, a smaller disc cartridge, i.e., an 8 cm disc cartridge and/or an adapter by selectively positioning the same on only one tray.

Another object of the present invention is to provide an optical recording/reproducing apparatus capable of using an adapter for accommodating an 8 cm disc and a naked disc as well as a 12 cm disc cartridge and an 8 cm disc cartridge by selectively positioning the same on only one tray.

Yet another object of the present invention is to provide a method of an optical recording/reproducing apparatus for automatically detecting which of disc cartridges, an adapter, and a naked disc (without a disc cartridge) is positioned on the tray at a given time, and automatically performing information recording and reproducing processes according to the detected result.

Additional objects and advantages of the invention will be set forth in part in the description which follows and, in part, will be obvious from the description, or may be learned by practice of the invention.

The above objects of the present invention will be accomplished by providing an optical recording/reproducing apparatus including a case, a tray mounted to the case and capable of being received and withdrawn into/from the case, and selectively accommodating disc cartridges of at least two different sizes, means for supporting the disc cartridges positioned on the tray according to the sizes of the disc cartridges, means for detecting the sizes of the disc cartridges positioned on the tray and a state of discs accommodated in the disc cartridges, means for rotating the discs in the disc cartridges positioned on the tray, and means for recording and/or reproducing information on and/or from the disc rotated by the rotating means.

The optical recording/reproducing apparatus according to the present invention further includes means for opening/ closing shutters mounted on the disc cartridges in response to the receiving/withdrawing of the tray with respect to the case, and means for pressing hubs of the respective discs accommodated in the disc cartridges, thus chucking the discs onto the rotational means.

The support means includes a press member contacting with, and thus, pressing a side of either a 12 cm disc cartridge and a smaller disc cartridge positioned on the tray, a holding member mechanism for holding both sides of the smaller disc cartridge, thus preventing a minute movement of the smaller disc cartridge positioned on the tray, and a horizontality member mechanism maintaining a horizontal orientation of the smaller disc cartridge with respect to a bottom of the tray.

The detecting section includes a first detecting part detecting the size of the 12 cm disc cartridge and the state of a disc accommodated therein, and a second detecting part detecting the size of the smaller disc cartridge and the state of a disc accommodated therein.

The first detecting part includes a plurality of first detecting holes formed on the tray corresponding to sensor holes of the 12 cm disc cartridge, and sense switches attached to a deck base, to be inserted into the sensor holes of the 12 cm disc cartridge through the first detecting holes.

The second detecting part includes at least one leaf switch attached to the deck base, exposed through guide grooves of the tray, the leaf switch detecting the size of the smaller disc cartridge positioned on the tray, by being selectively in contact with contact portions of press rods which are moved along guide apertures and thus turned on/off, a plurality of second detecting holes formed on the tray corresponding to sensor holes of the smaller disc cartridge, and a photo-sensor attached to the deck base, detecting the state of the disc accommodated in the smaller disc cartridge by radiating a laser beam through the second detecting holes to the sensor holes of the smaller disc cartridge, and receiving the laser beam. The photo-sensor includes a light emitting element radiating the laser beam to a diffusion lens inserted into a fitting hole of an opening cover through a second detecting hole of the tray and a pierce hole of a smaller disc cartridge case, a plurality of light receiving elements disposed at positions corresponding to the sensor holes of the smaller disc cartridge, the light receiving elements receiving the laser beams transmitted to the sensor holes of the smaller disc cartridge via the diffusion lens, and a circuit board electrically detecting the laser beams received by the light receiving elements. Here, the light emitting element with the light receiving element are attached to, thus supported by the circuit board.

The optical recording/reproducing apparatus according to the preferred embodiment of the present invention includes a case, a tray mounted to the case capable of being received and withdrawn into/from the case, and selectively accommodating disc cartridges of at least two different sizes, means for supporting the disc cartridges positioned on the tray according to the sizes of the disc cartridges, first positioning means for determining the position of the 12 cm disc cartridge on the tray and positioning the 12 cm disc cartridge at the determined position, a first detecting part detecting a size of the 12 cm disc cartridge positioned by the first positioning means, and the state of the 12 cm disc accommodated in the 12 cm disc cartridge, second positioning means for determining the position of the smaller disc cartridge on the tray and positioning the smaller disc cartridge at the determined position, a second detecting part detecting a size of the smaller disc cartridge positioned by the second positioning means, and the state of the 8 cm disc accommodated in the smaller disc cartridge, means for rotating the discs respectively accommodated in the disc cartridges positioned on the tray, and means for recording and/or reproducing the information on/from the discs rotated by the rotating means.

The first positioning means includes a pair of first positioning pin holes formed on the tray corresponding to insert holes of the 12 cm disc cartridge, and a pair of first positioning pins disposed on a deck base and to be inserted into the insert holes of the 12 cm disc cartridge after passing through the first positioning pin holes.

The second positioning means includes a pair of second positioning pin holes formed on the tray corresponding to insert holes of the smaller disc cartridge, a rotational bracket mounted to the case by a hinge pin, the rotational bracket having a pair of second positioning pins to be inserted into the insert holes of the smaller disc cartridge after passing through the second positioning pin holes, and means for rotating the rotational bracket upward and downward, wherein the rotating means is automatically operated through signals sensed by the second detecting part to move a rotational bracket. The rotational bracket rotating means includes a slider to be reciprocally moved along guide protrusions protruded from the bottom of the case in a linear direction, a driving motor, driving means for driving the slider, to be turned on/off in accordance with a signal sensed by the second detecting part, and a power transmitter transmitting a driving power from the driving motor to the slider.

A method of optical recording/reproducing apparatus according to the preferred embodiment of the present invention includes the steps of (a) detecting whether a disc cartridge received in a tray is positioned, (b) moving recording/reproducing means to an initial position, (c) detecting a size of the disc cartridge positioned on the tray, (d) detecting whether a disc accommodated in the disc cartridge is a single-sided disc or a double-sided disc, (e) detecting whether the disc is formatted, (f) displaying the size of the disc cartridge, whether the disc is a single-sided disc or a double-sided disc, and whether the disc is formatted as the sensed results of the above steps (a), (c), (d), and (e), (g) detecting whether a recording surface of the disc is sensed, (h) detecting whether information is to be recorded on the disc or reproduced from the disc, and (i) recording and/or reproducing the information on and/or from the disc according to the sensed results.

BRIEF DESCRIPTION OF THE DRAWINGS

The above and other objects and advantages will be more apparent by describing preferred embodiments in greater detail with reference to the accompanying drawings of which.

DESCRIPTION OF THE PREFERRED EMBODIMENT

Figure 1:
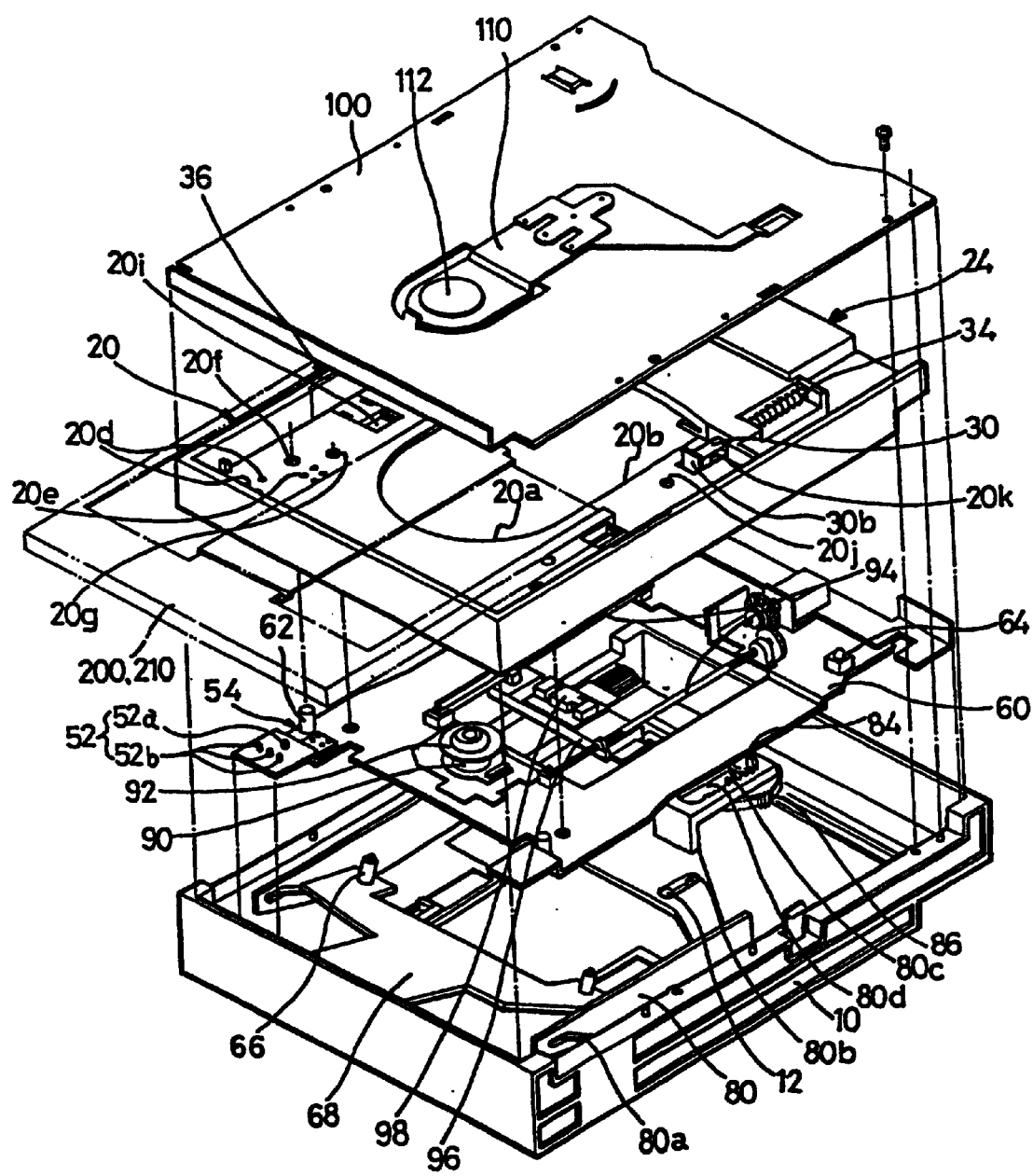
FIG. 1 is an exploded perspective view showing an optical recording/reproducing apparatus according to an embodiment of the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
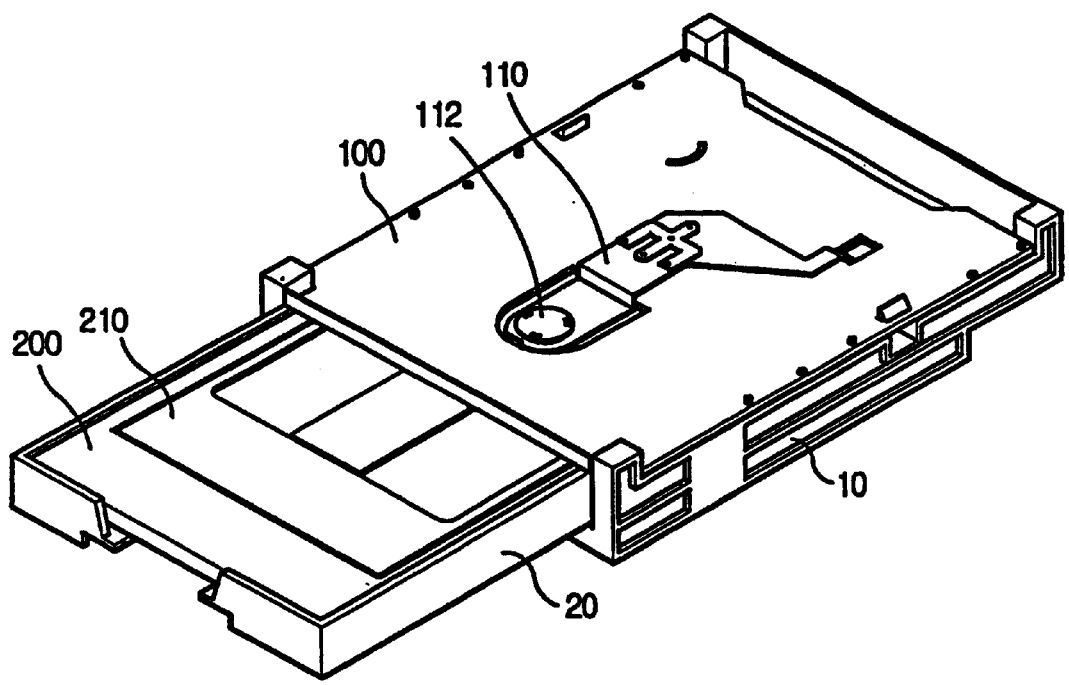
FIG. 2 is a perspective view showing the optical recording/reproducing apparatus of FIG. 1 assembled.
Figure 3:
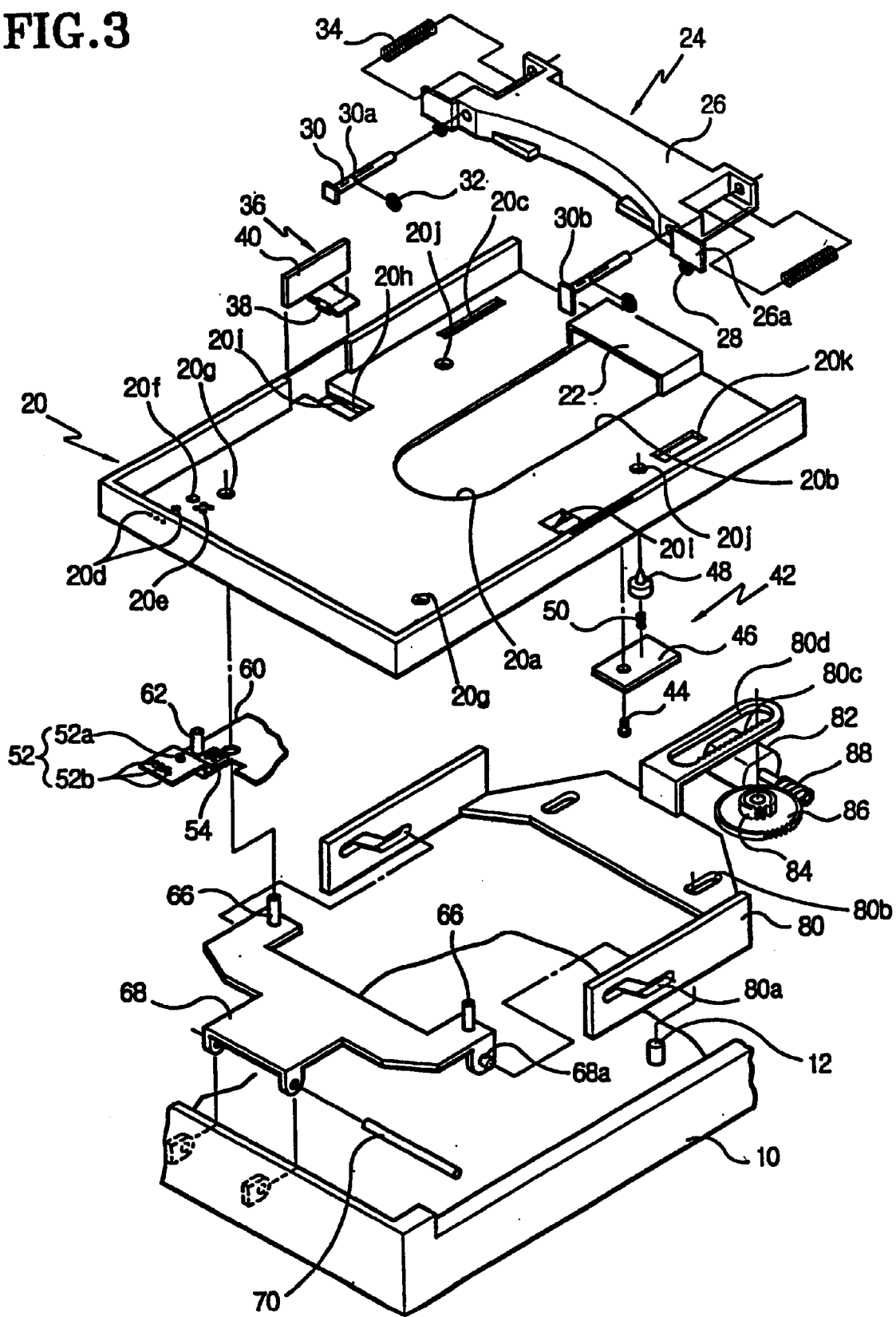
FIG. 3 is an exploded perspective view showing a main portion of the optical recording/reproducing apparatus according to the preferred embodiment of the present invention.

FIGS. 1 to 3 show an optical recording/reproducing apparatus according to an embodiment of the present invention. In these figures, a reference numeral 10 is a case, and is a tray. The tray 20 is mounted to the case 10 and is capable of being received/withdrawn into/from the case 10. One of different kinds of disc cartridges having different sizes, i.e., either a disc cartridge 200 for accommodating a disc having a diameter of 12 cm (hereinafter called a 12 cm disc cartridge), or a smaller disc cartridge 210 (hereinafter sometimes called an 8 cm disc cartridge) for accommodating a disc having a diameter of 8 cm is selectively positioned on the tray 20. Support means is provided to the tray 20 to support the disc cartridges 200 and 210 in accordance with the sizes of the disc cartridges 200 and 210 so that the disc cartridges 200 and 210 are prevented from moving while selectively positioned on the tray 20.

Further, the optical recording/reproducing apparatus of the present invention includes a detecting section for detecting the size of the 12 cm and smaller disc cartridges 200 and 210, and the states of discs d and d' accommodated therein, respectively, means for rotating the discs d and d' (see FIGS. 7, 8, 10, 12, and 13) accommodated in the 12 cm and smaller disc cartridges positioned on the tray 20, and means for recording/reproducing information on/from the discs d and d' rotated by the rotating means. The optical recording/reproducing apparatus of the present invention further includes means for opening/closing shutters 202 and 220 (see FIGS. 4, 6, and 9) respectively mounted on the 12 cm and smaller disc cartridges 200 and 210 in response to the receiving/withdrawing of the tray into/from the case 10, and means for pressing hubs of the discs d and d' accommodated in the respective disc cartridges 200 and 210 so as to chuck the discs d and d' onto the rotating means. Hereinafter, a construction of the optical recording/reproducing apparatus according to the present invention will be described in greater detail with reference to FIGS. 4 to 13.

Figure 4:
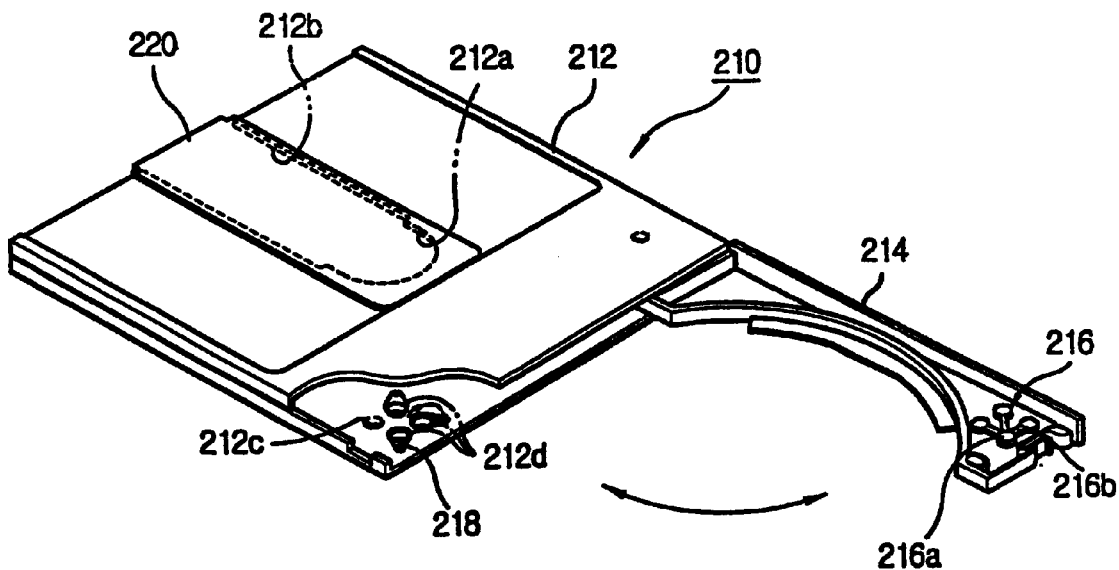
FIG. 4 is a perspective view showing a smaller disc cartridge which is receivable by the tray of the optical recording/reproducing apparatus according to the preferred embodiment of the present invention.
Figure 5:
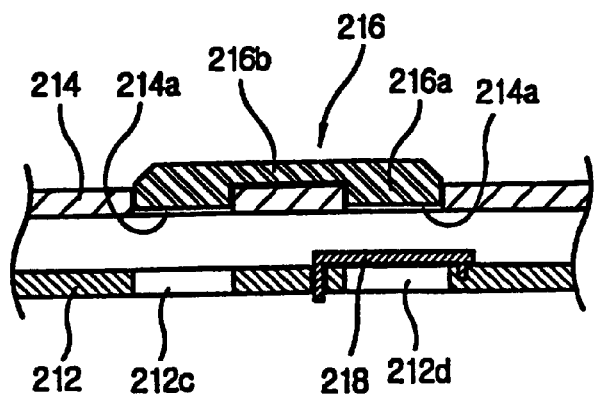
FIG. 5 is an enlarged sectional view showing the smaller disc cartridge in FIG. 4.

FIG. 4 is a perspective view showing a smaller disc cartridge 210 positioned on the tray 210 of the optical recording/reproducing apparatus according to the embodiment of the present invention, and FIG. 5 is an enlarged sectional view of the smaller disc cartridge 210 shown in FIG. 4.

As shown, the smaller disc cartridge 210 has a cartridge case 212, and an opening cover 214. An accommodating hole 212a with an opening 212b are formed extending through an upper and a lower side of the cartridge case 212. The opening cover 214 is pivotally coupled to the cartridge case 212 and prevents a separation of the disc d' (not shown in the drawing) from the smaller disc cartridge 210.

A piercing hole 212c and a plurality of second sensor holes 212d are formed at a rear corner area of the cartridge case 212. Additionally, fitting holes 214a corresponding to the piercing hole 212c and the second sensor holes 212d are formed on the opening cover 214.

The second sensor holes 212d may include a hole for detecting whether the disc d' accommodated in the cartridge case 212 has been exchanged (withdrawn from the cartridge case 212), a hole for detecting whether the disc d' is a single-sided disc or a double-sided disc, and a hole for detecting whether the disc d' is formatted, for example.

A diffusion lens 216 of a transparent material is disposed at the fitting holes 214a of the opening cover 214. The diffusion lens 216 has insert portions 216a respectively inserted into the fitting holes 214a, and connectors 216b for connecting respective insert portions 216a. A light receiving plate 218 is disposed at each of second sensor holes 212d of the cartridge case 212, to open/close the second sensor holes 212d at a user's will. The light receiving plate 218 is manually operated.

The 12 cm disc cartridge has an accommodating hole 200a with an opening 200b formed extending through an upper and lower side of the 12 cm disc cartridge 200 (see FIG. 6) and will be described in greater detail later on.

Meanwhile, referring to FIGS. 1 to 3, the tray 20 has a center hole 20a, and a feeding hole 20b at a bottom thereof. The center hole 20a is aligned with the accommodating holes 200a and 212a and the feeding hole 20b is aligned with the openings 200b and 212b of the 12 cm and smaller disc cartridges 200 and 210. The feeding hole 20b communicates with the center hole 20a. The feeding hole 20b is the space where a pickup base 96 moves and the center hole 20a is the space in which a turn table 92 is inserted. Also, the accommodating holes 200a, 212a are for the turn table 92 and the openings 200b, 212b are for the pickup base 96. Due to the presence of the center hole 20a and the feeding hole 20b, the discs d and d' are exposed to the recording/reproducing means when the shutters 202 and 220 of the respective disc cartridges 200 and 210 are opened by shutter opening/closing means. It is preferable that the accommodating hole 212a and the opening 212b of the smaller disc cartridge 210 have the same diameter and width with those of the accommodating hole 200a and the opening 200b of the 12 cm disc cartridge 200.

In addition, a guide part 22 is provided at an end of the feeding hole 20b of the tray 20, having a predetermined height. A pair of guide apertures 20c and 20k are respectively formed at both sides of the guide part 22.

A plurality of first and second detecting holes 20d and 20e are formed at a corner area of the tray 20 and first and second positioning pin holes 20f and 20g each are formed at both corner areas of the tray 20. A pair of rectangular coupling holes 20i having guide rails 20h are formed between the first and the second positioning pin holes 20f and 20g and the guide apertures 20c and 20k. Adjacent to the coupling holes 20i, a pair of penetrating holes 20j are formed.

The guide part 22 is provided with a press member 24. The press member 24 contacts and presses a side of both the 12 cm and smaller disc cartridges 200 and 210 positioned on the tray 20. Holding members 36 are installed in the coupling holes 20i and hold the smaller disc cartridge 210 from both sides thereof so as to prevent the movement of the smaller disc cartridge 210 while the same is positioned on the tray 20. Additionally, horizontality members 42, respectively mounted in the penetrating holes 20j, maintain the horizontality of the smaller disc cartridge 210 with respect to the bottom of the tray 20 when the smaller disc cartridge 210 is positioned on the tray 20.

The press member 24 has a press slider 26, press portions 26a, hooks 28, and a pair of press rods 30. The press portions 26a are formed at both sides of the press slider 26 to press a side of the 12 cm disc cartridge 200. The hooks 28 are formed at respective lower sides of the press portions 26a and inserted into the guide apertures 20c and 20k of the tray 20. The press rods 30 are movably installed at both sides of the press slider 26 and press a side of the smaller disc cartridge 210 when the same is positioned on the tray 20.

The press rods 30 have contact portions 30b. Grooves 30a are formed around the respective circumferential of the press rods 30 and E-rings 32 are disposed around the grooves 30a. Thus, the press rods 30 are never completely separated from the press sliders 26. Additionally, first coil springs 34 are disposed around the press rods 30 to return the press rods 30 to the initial position. Here, the respective contact portions 30b of the press rods 30 are moved along the guide apertures 20c and 20k formed at the bottom of the tray 20. Thus, the 12 cm disc cartridge 200 and/or smaller disc cartridge 210 are supported by, and properly positioned on the tray 20.

Additionally, the holding members 36 respectively have holder brackets 40 movably disposed at the coupling holes 20i, respectively. The coupling holes 20i are formed at the middle of the sides of the tray 20. The holder brackets 40 respectively have guide pieces 38 formed with guide grooves into which guide rails 20h of the coupling holes 20i are inserted. A leading edge of each of the guide pieces 38 is slanted to prevent a possible interference that would occur with a lower surface of the 12 cm disc cartridge 200 when the 12 cm disc cartridge 200 is positioned on the tray 20.

Further, each horizontality member 42 has a bracket 46, a bracket shaft 48, and a second coil spring 50. The brackets 46 are fixed to a lower surface of the tray 20 by screws 44. The bracket shafts 48 are movably disposed on the brackets 46, capable of being moved upward and downward. The second coil springs 50 elastically support the bracket shafts 48 upwardly. Leading edges of the bracket shafts 48 pass through the piercing holes 20j of the tray 20 and protrude therefrom. The upper sides of the bracket shafts 48 protruded from the piercing holes 20j are then inserted into the position holes 212e (see FIG. 10) formed at the lower surface of the smaller disc cartridge 210. Thus, the horizontality of the smaller disc cartridge 210 is maintained.

Meanwhile, the detecting section has a first cartridge part, and a second cartridge part. The first cartridge part detects the state of the disc d' accommodated in the 12 cm disc cartridge 200, and the second cartridge part detects the state of the disc d' accommodated in the smaller disc cartridge 210.

The first cartridge part has a plurality of sense switches 52. The sense switches 52 pass through the first detecting holes 20d formed in the tray 20 and then inserted into first sensor holes 200c (see FIG. 6) of the 12 cm disc cartridge 200. Here, the first sensor holes 200c may have a cartridge sensor hole, and a plurality of disc state sensor holes, for example. In this case, the cartridge sensor hole is in the closed state, and the disc state sensor holes are open/closed in accordance with the state of the disc.

The sense switches 52 are attached to the deck base 60, and have a first sense switch 52a for sensing the types of the cartridges, and second sensor switches 52b for sensing the state of the disc. In an initial state that the cartridge is not yet mounted to the tray 20, the sense switches 52 are in an "off" state. Then, when the cartridge 200 is positioned on the tray 20 and advanced into the case 10 of the body, the deck base 60 is raised and accordingly, the sense switches 52 are respectively inserted into the first sensor holes 200c through a plurality of the first sensor holes 20d which are formed at the tray 20. In such a situation, since the cartridge sensor hole is in the closed state, the first sense switch 52a is pressed by the cartridge so that the first sensor switch 52 is turned to the "on" state. Consequently, it is detected that the cartridge is the 12 cm disc cartridge.

The second cartridge part has at least one leaf switch 64, and a photo-sensor 54. The leaf switch 64 is attached to the deck base 60, while being exposed through the guide apertures 20c and 20k of the tray 20. The leaf switch 64 senses the size of the smaller disc cartridge 210. The photo-sensor 54 senses the state of the disc d' accommodated in the smaller disc cartridge 210. Here, the leaf switch 64 is selectively turned on/off to detect the size of the smaller disc cartridge 210. More specifically, when the contact portions 30b of the press rods 30 which are moved along the guide apertures 20c and 20k selectively come in contact with the leaf switch 64, the leaf switch 64 is accordingly turned on/off. It is determined that the cartridge is the smaller disc cartridge when the leaf switch 64 is in "on" state.

Figure 8:
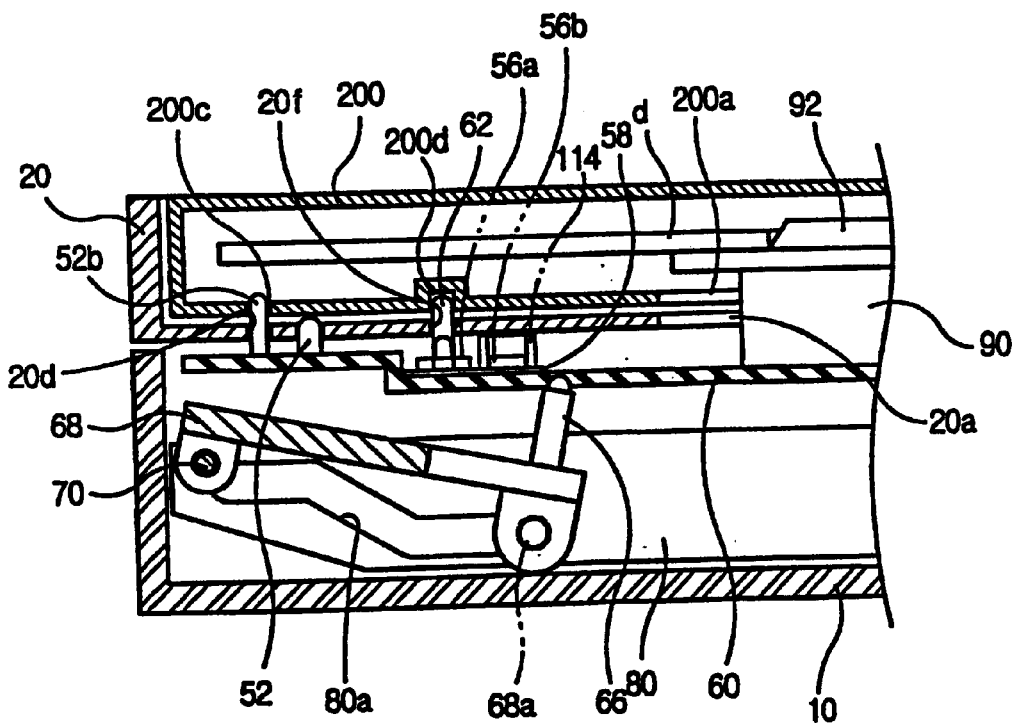
FIG. 8 is an enlarged view of an area A shown in FIG. 7.
Figure 9:
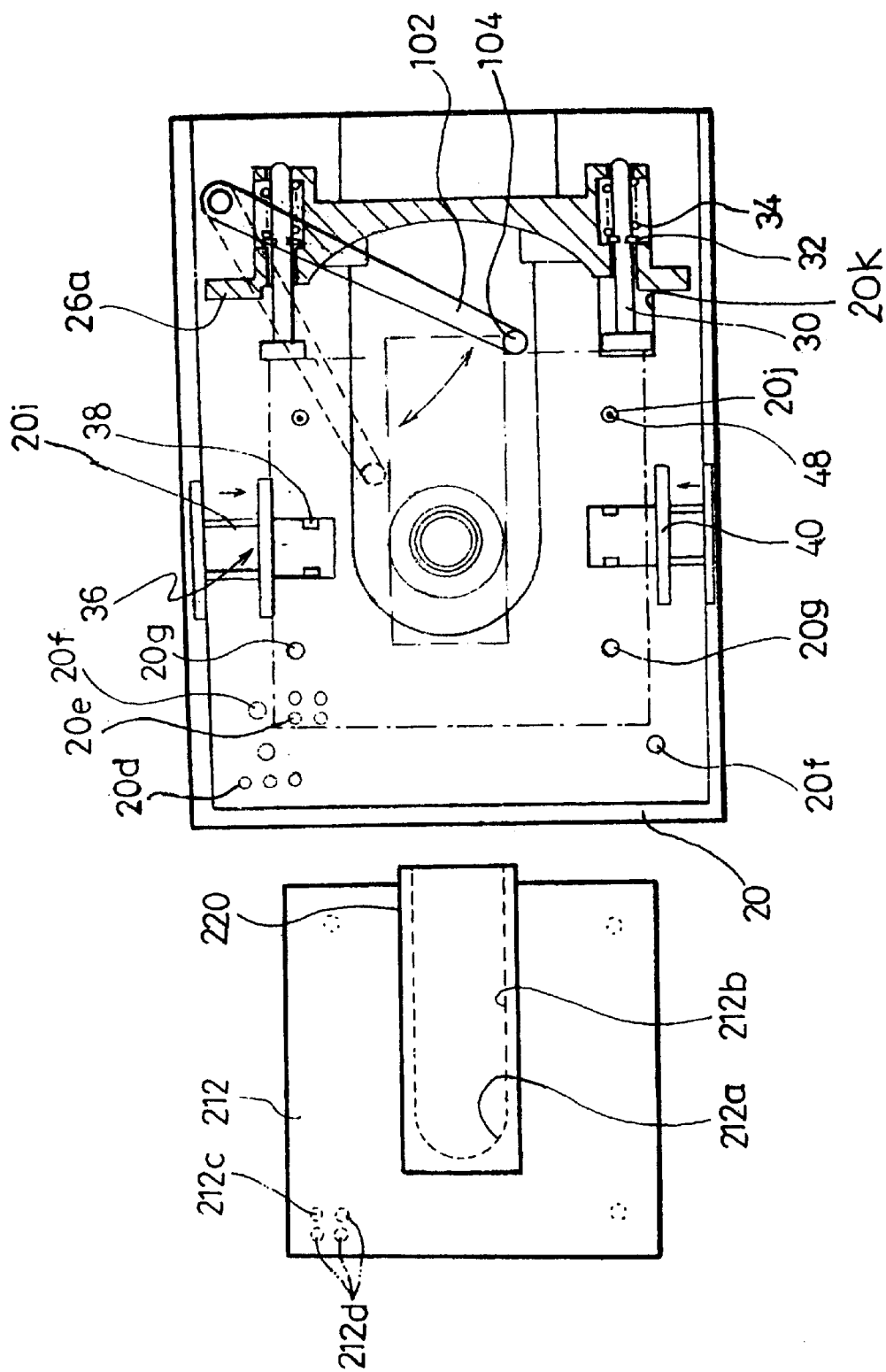
FIG. 9 is a plan view showing a smaller disc cartridge positioned on the tray of the optical recording/reproducing apparatus according to the embodiment of the present invention.
Figure 10:
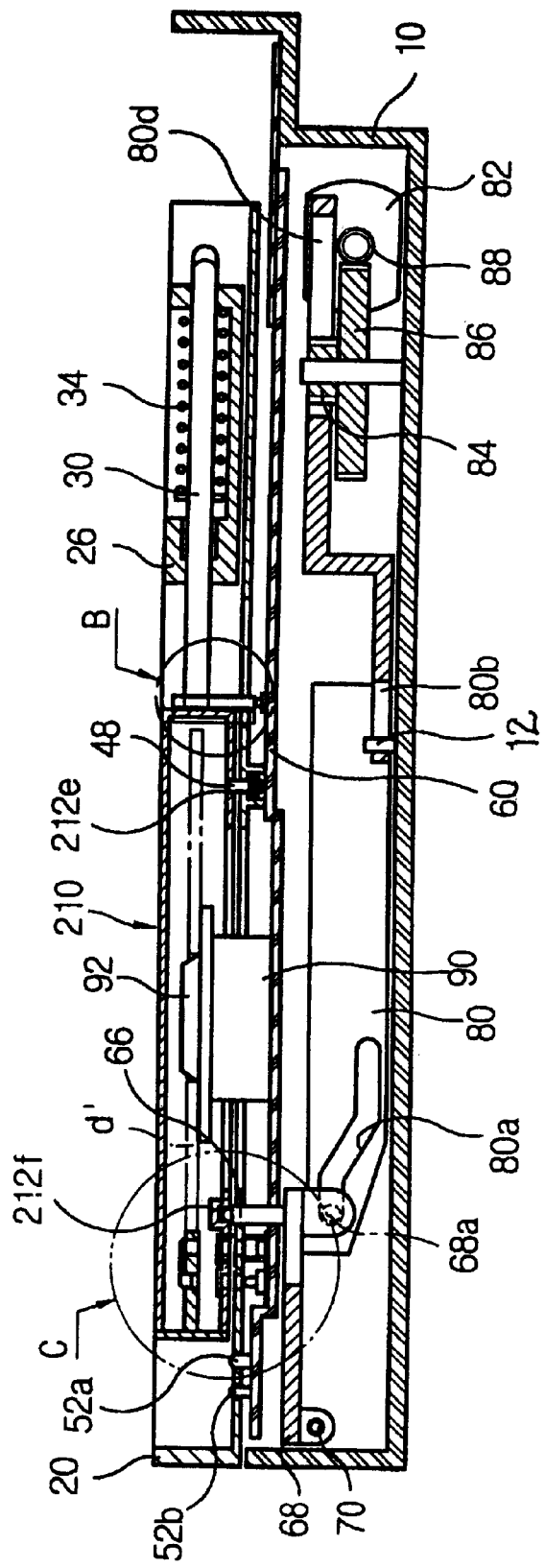
FIG. 10 is a sectional side elevation view of the optical recording/reproducing apparatus in a state as shown in FIG. 9.

The photo-sensor 54 has a light emitting element 56a, light receiving elements 56b, and a circuit board 58 (see FIG. 8). The light emitting element 56a projects a laser beam toward the diffusion lens 216 through the second detecting holes 20e and the piercing hole 212c of the smaller disc cartridge case 212. Here, the diffusion lens 216 is inserted into the fitting holes 214a of the opening cover 214. The light receiving elements 56b are disposed at the positions corresponding to the second sensor holes 212d of the smaller disc cartridge 210, to receive the laser beam transmitted to the second sensor holes 212d along the diffusion lens 216. The light emitting element 56a and the light receiving elements 56b are attached to the circuit board 58 which electrically detects the laser beam received by the light receiving elements 56b.

A holder 114 is integrally formed on the circuit board 58. The holder 114 has a predetermined height so that it surrounds the light receiving element 56b. Due to the presence of the holder 114, the laser beam transmitted to the light receiving element 56b via the diffusion lens 216 is not diffused to the other neighboring light receiving elements 56b, so that the malfunction of the light receiving elements 56b is prevented.

As described, according to the optical recording/ reproducing apparatus of the present invention, it is detected that the cartridge is the 12 cm disc cartridge when the first sense switch 52a in "on" state. Also, the cartridge is detected as the 8 cm disc cartridge when the leaf switch 64 is turned "on". The state of the disc received in the 12 cm or 8 cm disc cartridge is detected through a plurality of the second sense switches 52b and the photo-sensor 54.

According to the present invention, not only the 12 cm or 8 cm disc cartridge, but also a naked disc can be positioned on the tray to be used. In this case, it is detected as the naked disc when the first sense switch 52a and the leaf switch 64 are in "off" state. Since there is no cartridge case, the first sense switch 52a and the leaf switch 64 are not pressed when the disc is positioned in the case. Accordingly, the first sense switch 52a and the leaf switch 64 are in "off" state.

Further, an adapter accommodating the 8 cm disc and for permitting use of 8 cm disc in the optical recording/ reproducing apparatus for 12 cm disc, can be mounted on the tray to be used, and in this case, the adapter is automatically detected. A third sensor switch (not shown in the reference drawings) for detecting the adapter is additionally provided. The third sense switch is such placed to correspond to an A3 sensor hole formed at the adapter. The A3 sensor hole is in open state. Accordingly, when the adapter is used, the third sense switch is inserted into the A3 sensor hole of the adapter. In the present invention, we set the state that the third sense switch is inserted into the A3 sensor hole as "off" state, and when the third sense switch is turned to the "off" state, it is detected that the adapter is positioned on the tray and inserted into the case.

As described, according to the present invention, 12 cm disc cartridge, 8 cm disc cartridge, the naked disc, or the adapter is automatically detected through a plurality of sense switches corresponding thereto which were set to have "on/off" state.

Additionally, a pair of first positioning pins 62 pass through the respective first positioning pin holes 20*f*, and protrude from the deck base 60 to determine the position of the 12 cm disc cartridge 200 on the tray 20. The first positioning pins 62 are inserted into insert holes 200*d* (see FIGS. 7 and 8) which are formed on the 12 cm disc cartridge, to position the 12 cm disc cartridge.

Meanwhile, a rotational bracket 68 is disposed at the case 10 by a hinge pin 70. The rotational bracket 68 has a pair of second positioning pins 66 which determine the position of the smaller disc cartridge 210 on the tray 20. The second positioning pins 66 are inserted into insert holes 212*f* (see FIGS. 10 and 12) which are formed on the smaller disc cartridge 210, to position the smaller disc cartridge 210.

The rotational bracket 68 is rotated upward/downward by rotational driving means driven in response to the photo-sensor 54 which detects the disc d' of the smaller disc cartridge 210.

The rotational bracket driving means has a slider 80, a driving motor 82, and a power transmitter to transmit the driving power of the driving motor 82 to the slider 80.

A pair of slanted slots 80*a* are formed at both sides of the slider 80 into which insert protrusions 68*a* protruding from both sides of the rotational bracket 68 are inserted. The slider 80 is formed with a pair of guide holes 80*b* at a bottom thereof into which guide protrusions 12 protruding from the case 10 are respectively inserted. The slider 80 has a coupling slot 80*d* formed with a rack gear 80*c* at its inner circumferential surface. The coupling slot 80*d* is formed at a rear side of the slider 80.

The power transmitter has a gear 84, a worm gear 86, and a worm 88. The gear 84 passes through the coupling slot 80*d* to be engaged with the rack gear 80*c*, and the worm gear 86 is integrally formed with the gear 84. The worm gear 86 is engaged with the worm 88, which is press-fitted to a shaft of the driving motor 82.

Meanwhile, refer to FIG. 1, the rotating means has a spindle motor 90 fixed to the deck base 60, and a turn table 92 press-fitted to a shaft of the spindle motor 90. The discs d and d' accommodated in the disc cartridges 200 and 210 are selectively loaded on the turn table 92.

Further, the recording/reproducing means has the pickup base 96, and the optical head 98. The pickup base 96 is linearly and reciprocally moved along a pair of guide rods 94 provided on the deck base 60 in parallel relation with each other. The optical head 98 is provided to an upper portion of the pickup base 96, and records/reproduces the information on/from the discs d and d' by projecting the laser beam onto the recording surface thereof.

Figure 6:
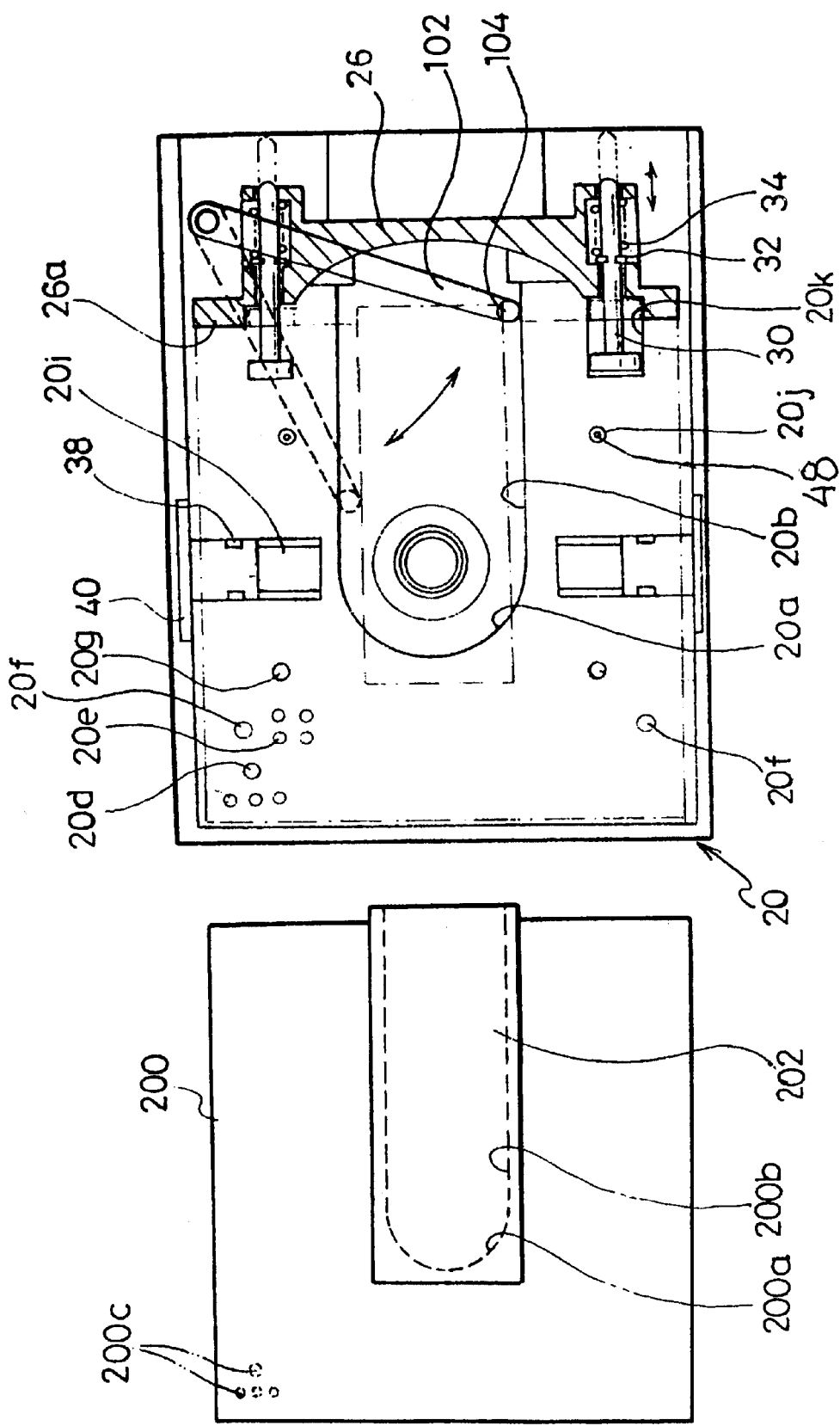
FIG. 6 is a plan view showing a 12 cm disc cartridge positioned on a tray of the optical recording/reproducing apparatus according to the embodiment of the present invention.

Also, as shown in FIGS. 1 and 6, the shutter opening/closing means has a link 102, an opening protrusion 104 as shown in FIG. 6, and a torsion spring (not shown). The link 102 is pivotally disposed at a lower surface of an upper cover 100, and the opening protrusion 104 protrudes from an end of the link 102. The shutters 202 and 220 mounted on the disc cartridges 200 and 210, respectively, are opened by means of the opening protrusion 104. The torsion spring (not shown) is installed at the other end of the link 102 so as to return the link 102 to an initial position.

The chucking means has a lever 110, and a damper 112 as shown in FIGS. 1 and 2. The lever 110 is caulked onto an upper surface of the upper cover 100, and the damper 112 presses the discs d and d' onto the turn table 92.

Hereinbelow, an operation of an optical recording/reproducing optical apparatus constructed as described above according to the present invention will be described in greater detail with respect to FIGS. 6 through 14*b*.

Figure 7:
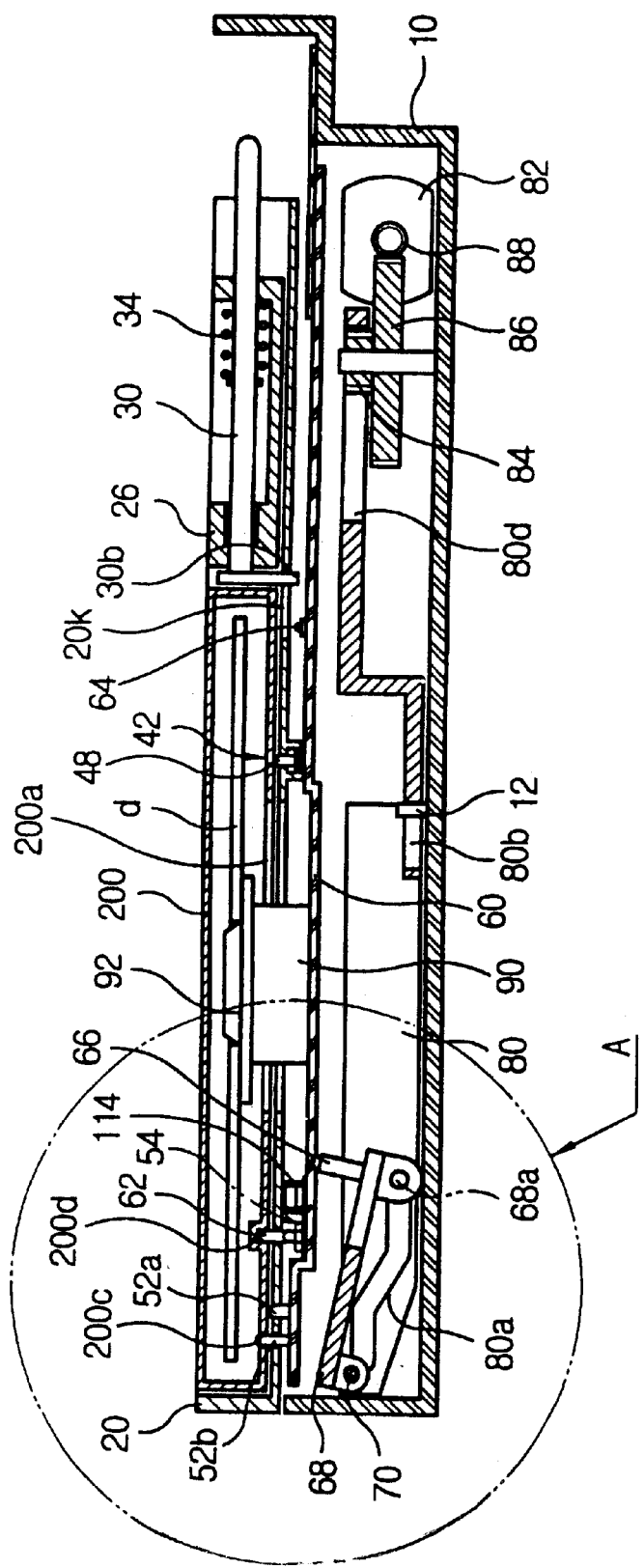
FIG. 7 is a sectional side elevation view of the optical recording/reproducing apparatus in a state as shown in FIG. 6.

When an ejecting button (not shown) provided at a front side of the case 10 is pushed, a loading motor (not shown) installed inside the case 10 rotates. Then, the tray 20 is ejected outward from the case 10. In such a situation, one of the 12 cm and smaller disc cartridges 200 and 210, or a naked disc (a disc without a disc cartridge) is positioned on the tray 20. FIGS. 6 to 8 show the 12 cm disc cartridge 200 positioned on the tray 20. As shown in the figures, when the 12 cm disc cartridge 200 is positioned on the tray 20, a lower surface of the 12 cm disc cartridge 200 is in close contact with the bottom of the tray 20. Also, the 12 cm disc cartridge 200 is supported by the press portions 26*a* of the press sliders 26 disposed behind the 12 cm disc cartridge 200. Thus, the movement of the 12 cm disc cartridge 200 is prevented.

In such a situation, as the 12 cm disc cartridge 200 is inserted into the tray 20, the contact portions 30*b* of the press rods 30 are pushed backward along the guide apertures 20*c* and 20*k*. Further, the bracket shaft 48 whose predetermined end has been protruded from the piercing holes 20*j* of the tray 20, is now moved downward by contact with the lower surface of the 12 cm disc cartridge 200.

Then, as the eject button is pushed again, the loading motor is reversely rotated, so that the tray 20 on which the 12 cm disc cartridge 200 is positioned is advanced into the case (Step S101). At this time, the shutter 202 mounted on the 12 cm disc cartridge 200 contacts with the opening protrusion 104 of the link 102 which is disposed on the upper cover 100. Accordingly, the shutter 202 is moved in one direction, so that the accommodating hole 200*a* and the opening 200*b* are opened.

When the tray 20 is completely advanced into the case 10, as shown in FIG. 7 and FIG. 8, the deck base 60 is elevated. Accordingly, the turn table 92 is advanced into the accommodating hole 200*a* of the 12 cm disc cartridge 200, so that the disc d is loaded thereon. Further, the first positioning pins 62 pass through the first positioning pin holes 20*f* of the tray 20, and then are inserted into the insert apertures (not shown) of the 12 cm disc cartridge 200. By doing so, the position of the 12 cm disc cartridge is determined, and the horizontality of the 12 cm disc cartridge 200 with respect to the bottom of the tray 20 is maintained.

Simultaneously, an end of the lever 110 caulked to the upper cover 100 is moved downward subsequent to the advancing of the tray 20 into the case 10. Subsequently, the damper 112 is advanced into the upper accommodating hole 200*a* of the 12 cm disc cartridge 200 to press the hub of the disc d and chuck the disc d onto the turn table 92.

In such a situation, it is checked whether the third sense switch is in "on" state (Step S102), and if yes, it is detected that the disc cartridge or the naked disc is positioned (Step S103), and if not, it is detected that the adapter is positioned (Step S104).

After the step 103 (S103), it is detected whether the disc cartridge or the naked disc is positioned. In this case, when the first sense switch and the leaf switch are in the "off" state, it is detected that the naked disc is positioned (Step S106). If not, it is detected that the disc cartridge is positioned (Step S107).

Here, when the first sense switch is in the "on" state (Step S108), it is determined that the disc cartridge is the 12 cm disc cartridge (Step S109). If the leaf switch is in "on" state (Step S110), it is detected that the disc cartridge is the 8 cm disc cartridge (Step S111).

After detecting the disc cartridge or the naked disc, the pickup base 96 having the optical head 98 mounted to the pickup base 96 is moved to an initial position (Step S112). In such a situation, by other sense switches which are selectively inserted into the first sensor holes of the disc cartridge 200, the states of the disc d is detected. For example, there may be a recording surface sense switch which is turned "on/off" (Step S113) so as to detect whether the disc is single-sided or double-sided (Steps S114 and S115). Also, there may be a format sense switch to be turned "on/off" (Step S116) so as to detect whether the disc is formatted or not (Steps S117 and S118).

After the size, recording surface, formatted status or the like are detected as above, the result thereof are displayed to the user for checking (Step S119). Then, it is detected whether to verify the recording surface of the disc or not (Steps S120 and S121). Then, it is detected whether the information is recorded or not (Steps S122, S123, and S124), the selected conditions are detected, and the information is recorded and/or reproduced on/from the disc in accordance with the selected conditions (Step S125).

Here, when the adapter is detected, the process is performed from the step 112 (S112) after the step 104 (S104). Then when the disc is detected (Step S106), the pickup is moved to the initial position (Step S106a), it is detected whether the disc is single-sided or double-sided (Step S106b), and the recording is performed (Step S106c). In such situation, whether the disc is single-sided or not is detected by the pickup which reads a reading area of the disc. More specifically, the pickup reads the data about A and B sides which is recorded on the reading area of the disc.

FIGS. 9 to 13 show the situation in which the smaller disc cartridge 210 is positioned on the tray 20, and the information is recorded/reproduced on/from the disc d' thereof. In the figures, the smaller disc cartridge 210 is positioned on the tray 20, pushing the press rods 30 provided to the press slider 26 backward. In this situation, the bracket shaft 48 whose one end is protruded from the piercing hole 20j of the tray 20 is inserted into the insert hole of the smaller disc cartridge 210. Also, the press rods 30 which have been pushed backward are moved toward the cartridge case 212 of the smaller disc cartridge 210 by the restoring force of the first coil spring 34. Accordingly, the movement of the disc cartridge 210 is prevented.

Then, the holder brackets 40 disposed at the coupling holes 20i of the tray 20 are pressed in a lateral direction. Accordingly, the holder brackets 40 are moved inward with respect to the tray 20 along the guide rails 20h into which the guide pieces 38 are inserted, and then press both sides of the case 212 of the disc cartridge 210. Thus, the movement of the smaller disc cartridge 210 in a lateral direction is prevented.

Figure 11:
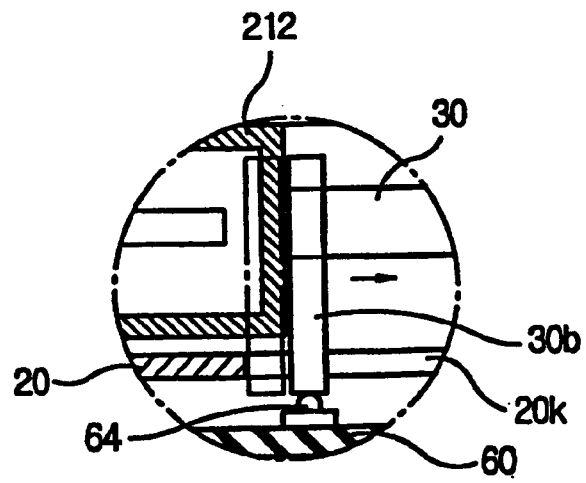
FIG. 11 is an enlarged view of an area B shown in FIG. 10.

In such a situation, when the tray 20 is advanced into the case 10, like the process described above, the shutter 220 of the smaller disc cartridge 210 is moved toward one direction by the opening protrusion 104 of the link 102. Then, by the deck base 60 which is elevated, the turn table 92 is moved upward and advanced into the accommodating hole 212a of the disc cartridge 210 and the disc d' is positioned thereon. At this time, as shown in FIG. 11, the leaf switch 64 attached to the deck base 60 contacts with the contact portions 30b of the press rods 30, and detects that the disc cartridge positioned on the tray 20 is the smaller disc cartridge 210. With the smaller disc cartridge 210 detected, the pickup base 96 having the optical head 98 is simultaneously moved to its initial position.

Figure 13:
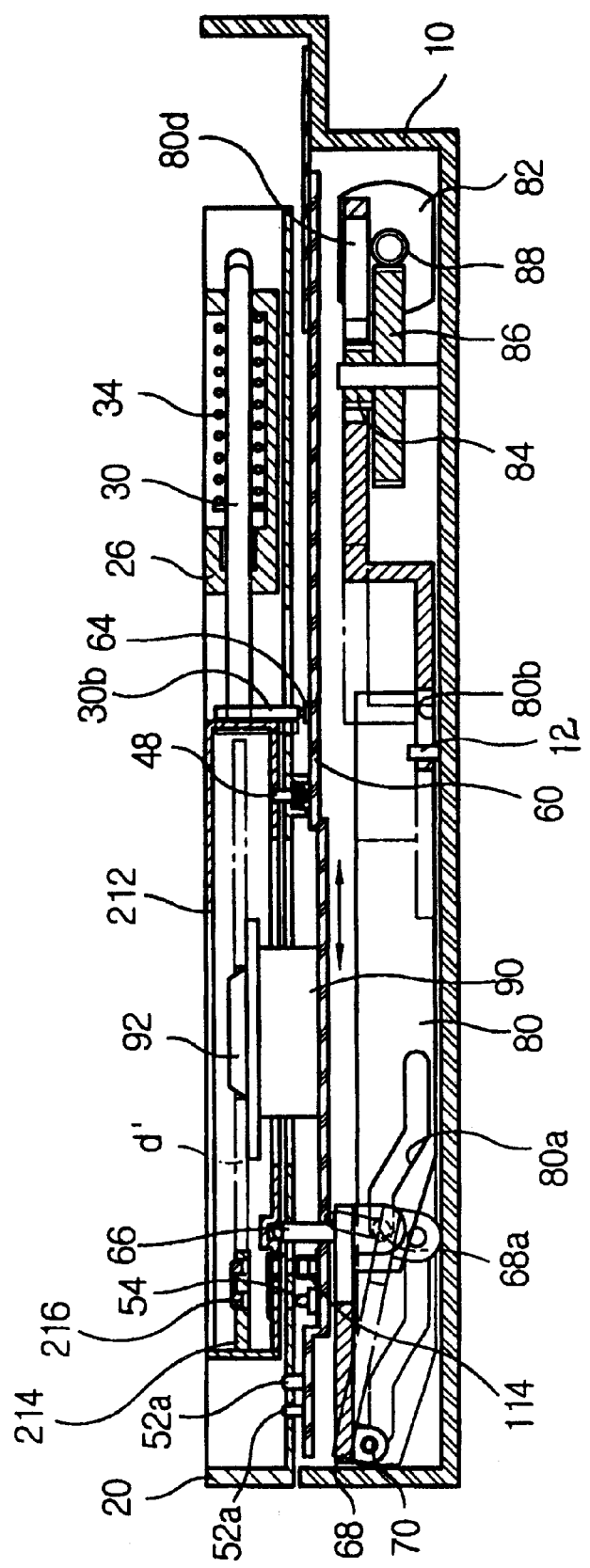
FIG. 13 is a sectional view showing an operation of a slider employed in the optical recording/reproducing apparatus according to the preferred embodiment of the present invention.
Figure 14A:
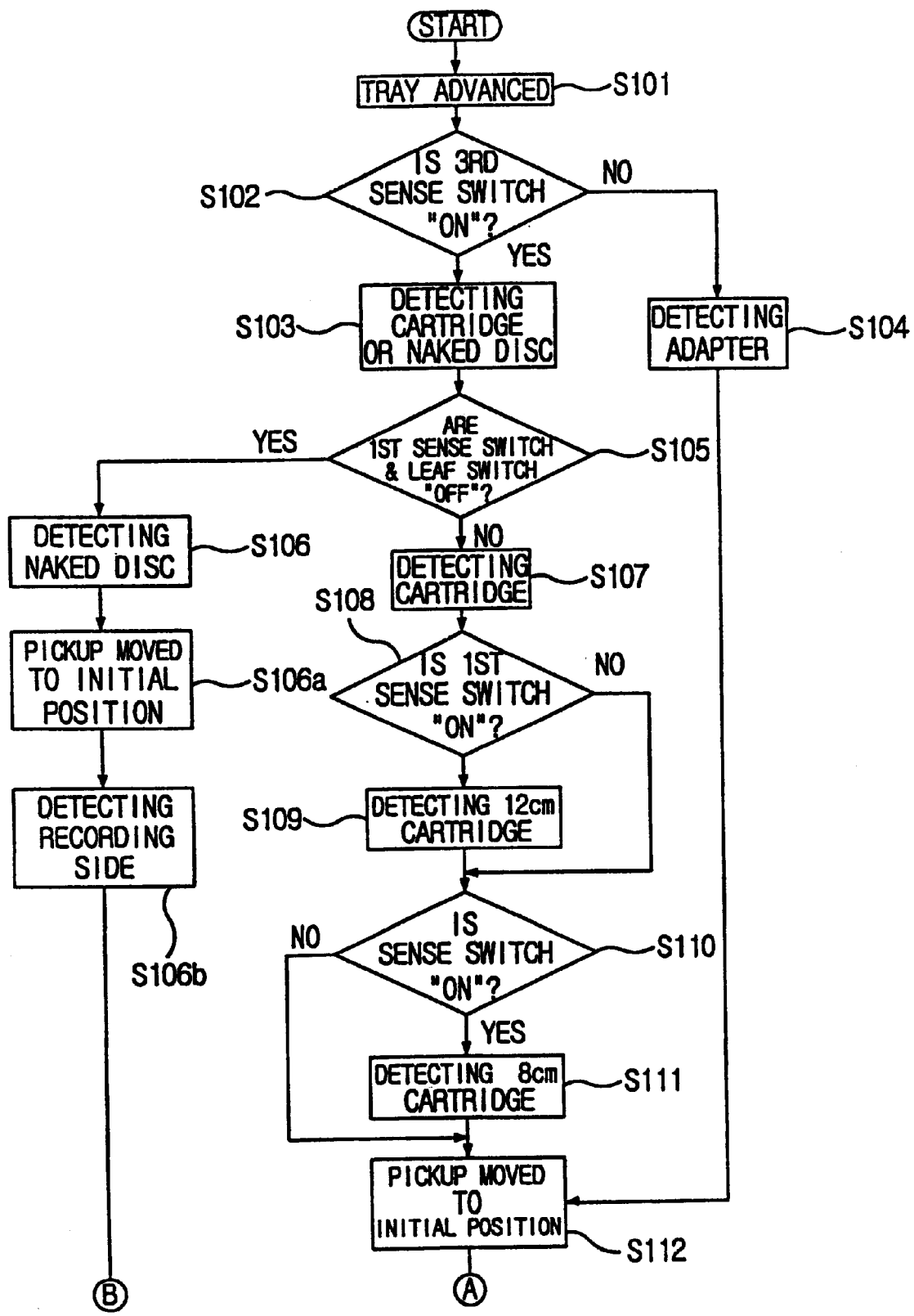
FIGS. 14A and 14B are flow charts for illustrating a method of recording/reproducing information using an optical recording/reproducing apparatus according to the embodiment of the present invention.
Figure 14B:
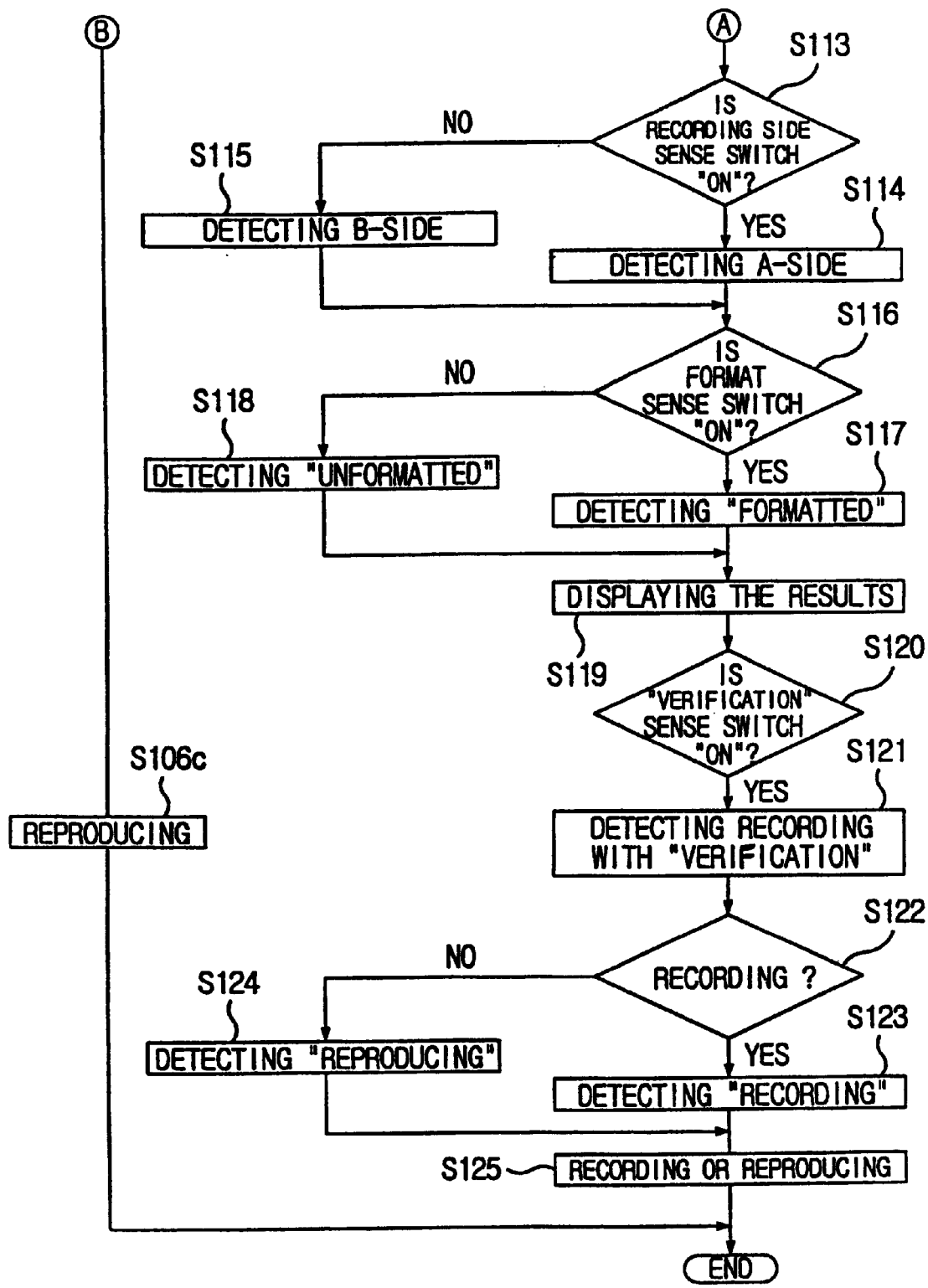

When the size of the smaller disc cartridge 210 is detected by using the leaf switch 64, the driving motor 82 is accordingly rotated based on the sensed signal. Simultaneously, the worm 88 coupled to the rotary shaft of the driving motor 82 and the worm gear 86 engaged with the worm 88 are rotated altogether. Also, as the gear 84 engaged with the rack gear 80c of the slider 80 is rotated, the slider 80 is moved backward as shown in FIG. 13. In such a situation, the rotational bracket 68 coupled to the inner side of the case 10 by the hinge pin 70 is elevated as the insert protrusions 68a protruded from both sides of the rotational bracket 68 are moved along the slanted slots 80a by the linear movement of the slider 80. Simultaneously, the second positioning pins 66 fixed to the upper surface of the rotational bracket 68 pass through the second positioning pin holes 20g of the tray 20, and are inserted into the insert holes of the disc cartridge 210. Accordingly, the position of the smaller disc cartridge 210 with respect to the tray 20 is determined.

After that, the laser beam is radiated from the light emitting element 56a which is attached to the circuit board 58 of the deck base 60. The laser beam passes through the second detecting hole 20e of the tray 20 and the piercing hole 212c of the disc cartridge 210, and to the diffusion lens 216 inserted into the fitting holes 214a of the opening cover 214. The laser beam is then received in the light receiving element 56b through the sensor hole 212d and the second detecting hole 20e. Accordingly, the state of the disc is detected.

Figure 12:
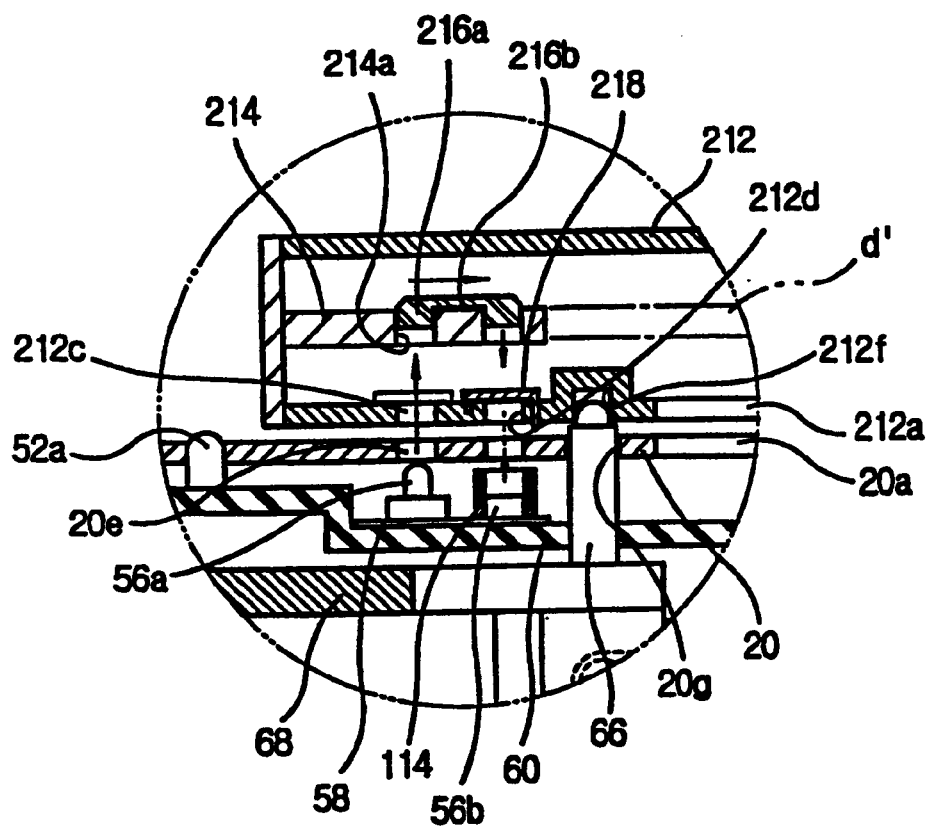
FIG. 12 is an enlarged view of an area C shown in FIG. 10.

As shown in FIG. 12, the laser beam radiated from the light emitting element 56a attached to the circuit board 58 is radiated to the insert portion 216a of the diffusion lens 216 while passing through the piecing hole 212c of the disc cartridge case 212. The laser beam radiated to the insert portions 216a is branched off to a plurality of beams which are respectively transmitted to the connectors 216b, which are linking the insert portions 216a with other ones of the insert portions 216a. Such transmitted laser beams are received in the light receiving element 56b formed at the position corresponding to the second sensor holes 212d and the second detecting holes 20e, after passing through the second sensor holes 212d and the second detecting holes 20e. Accordingly, it is automatically determined whether the disc accommodated in the disc cartridge is a single-sided disc or a double-sided disc, and formatted or unformatted.

More specifically, if the light receiving plate 218 movably attached to the disc cartridge case 212 is manually operated and thus blocks one of the second sensor holes 212d, then the laser beam radiated through the diffusion lens 216 is not transmitted to the light receiving element 56b. Thus, it is determined that the disc d' has not been drawn out from the disc cartridge 210 even once. If the light receiving plate 218 blocks another sensor hole 212d, then it is determined that the disc d' is a double-sided disc, and if not, the disc d' is determined to be a single-sided disc. Finally, whether the disc d' is formatted is determined by the open/closed state of the other sensor hole 212d.

Here, due to the presence of the holder 114 surrounding the light receiving elements 56b, the laser beams are not diffused through the other neighboring light receiving elements 56b. Accordingly, the precise detecting of the state of the disc can be guaranteed.

If a naked disc is positioned onto the tray 20, then the optical recording/reproducing apparatus senses such a state, so that it moves the pickup base 96 disposed with the optical head 98 to the initial position. Then, it is detected whether the disc is a single-sided disc or a double-sided disc, and the information is recorded and/or reproduced on/from a recordable and/or reproducible track of the disc d'.

Meanwhile, there is an A3 sensor hole which is in an open-state. Thus, when the adapter receiving the 8 cm disc d' is positioned onto the tray 20, the third sense switch is inserted into the A3 sensor hole, and accordingly it is detected that the adapter for the 8 cm disc is positioned. The adapter is for accommodating either of the 8 cm or 12 cm discs.

When the adapter is detected through the sense switch, the pickup base 96 installed along with the optical head 98 is moved to the initial position. Then, a detection is made whether the disc d' is single-sided or double-sided, and the information is recorded/reproduced on/from the detected available side(s) of the disc d'.

As described above, according to the optical recording/reproducing apparatus of the present invention, since the disc cartridges of different sizes, the naked disc, and the adapter receiving the 8 cm disc can be positioned on only one tray to be used, the compatibility thereof is enhanced, and the cost is reduced.

Further, according to the optical recording/reproducing apparatus of the present invention, since the state of the disc accommodated in the disc cartridge and the adapter positioned on the tray are automatically detected, and since the operation thereof is automatically carried out according to the sensed state of the disc, the time taken to record/reproduce the information on the disc is shortened, thus providing a greater convenience to the user.

While the present invention has been shown and described with reference to the preferred embodiment thereof, it will be understood by those skilled in the art that various changes in form and details may be effected therein without departing from the spirit and scope of the invention as defined by the appended claims.

What is claimed is:

1. An optical recording and/or reproducing apparatus to accommodate disc cartridges of at least two different sizes which receive respective discs of different sizes, comprising:
    a case;
    a tray mounted to the case and receivable into and withdrawable from the case in a first direction, the tray selectively accommodating the disc cartridges;
    means for supporting the disc cartridges positioned on the tray according to sizes of the disc cartridges, so as to prevent movement of the disc cartridges on the tray;
    means for detecting from the disc cartridges the sizes of the disc cartridges positioned on the tray, and states of the respective discs accommodated in the disc cartridges, the means for detecting being moveable in a second direction other than the first direction relative to the tray so as to detect from the disc cartridges;
    means for rotating the discs in the disc cartridges selectively positioned on the tray; and
    means for recording information on and/or reproducing the information from the discs rotated by the rotating means.

2. The optical recording and/or reproducing apparatus as claimed in claim 1, wherein:
    each of the disc cartridges comprises
        an accommodating hole,
        an opening, and
        a shutter to open/close the accommodating hole and the opening; and
    the optical recording and/or reproducing apparatus further comprises means for opening/closing the shutters in response to reception/withdrawal of the tray with respect to the case.

3. The optical recording and/or reproducing apparatus as claimed in claim 2, further comprising:
    an upper cover coupled to an upper portion of the case and having a lower surface;
    wherein the shutter opening/closing means comprises
        a link pivotally disposed at the lower surface of the upper cover, and having first and second ends,
        an opening protrusion protruding from the first end of the link to contact with respective sides of the shutters of the disc cartridges upon reception of the tray within the case, and
        a spring disposed at the second end of the link, to return the link to an initial position, wherein the link is pivoted in response to movement of the tray with respect to the case.

4. The optical recording and/or reproducing apparatus as claimed in claim 1, wherein the respective discs accommodated in the disc cartridges each have a hub, and the optical recording and/or reproducing apparatus further comprises means for pressing the hubs of the discs accommodated in the disc cartridges, to chuck the discs onto the rotating means.

5. The optical recording and/or reproducing apparatus as claimed in claim 1, wherein the tray has a center hole and a feeding hole corresponding to the accommodating hole and the opening of the two disc cartridges which comprise a first disc cartridge to hold a disc having a diameter of 12 cm and a second smaller disc cartridge to hold a disc of a smaller diameter, so that the discs are exposed to the recording and/or reproducing means therethrough.

6. The optical recording and/or reproducing apparatus as claimed in claim 1, wherein the rotating means comprises:
    a turn table onto which the discs accommodated in the disc cartridges are positioned; and
    a spindle motor to rotatably drive the turn table.

7. The optical recording and/or reproducing apparatus as claimed in claim 1, wherein the recording and/or reproducing means comprises:
    an optical head;
    a pickup base on which the optical head is disposed; and
    a pair of guide rods to guide the pickup base in a radial direction of the discs while the corresponding disc cartridges are mounted on the tray so that the pickup base is reciprocally and linearly moved.

8. The optical recording and/or reproducing apparatus of claim 1, wherein the detected state comprises whether the respective disc has been exchanged and removed from within the corresponding one of disc cartridges.

9. The optical recording and/or reproducing apparatus of claim 1, wherein the detected state comprises whether the respective disc is single or double sided.

10. The optical recording and/or reproducing apparatus of claim 1, wherein the detected state comprises whether the respective disc has been formatted.

11. The optical recording and/or reproducing apparatus of claim 1, wherein
    the tray further accommodates naked discs;
    the means for supporting further supports the naked discs positioned on the tray; and
    the means for detecting further detects whether the tray is accommodating the naked discs or the disc cartridges.

12. The optical recording and/or reproducing apparatus of claim 11, wherein the detected state comprises whether the respective disc has been exchanged and removed from within the corresponding one of the disc cartridges.

13. The optical recording and/or reproducing apparatus of claim 12, wherein the detected state comprises whether the respective disc is single or double sided.

14. The optical recording and/or reproducing apparatus of claim 13, wherein the detected state comprises whether the respective disc has been formatted.

15. An optical recording and/or reproducing apparatus to accommodate disc cartridges of at least two different sizes which receive respective discs of different sizes, comprising:
   a case;
   a tray mounted to the case and receivable into and withdrawable from the case, the tray selectively accommodating the disc cartridges;
   means for supporting the disc cartridges positioned on the tray according to sizes of the disc cartridges, so as to prevent movement of the disc cartridges on the tray;
   means for detecting the sizes of the disc cartridges positioned on the tray, and states of the respective discs accommodated in the disc cartridges;
   means for rotating the discs in the disc cartridges selectively positioned on the tray; and
   means for recording information on and/or reproducing the information from the discs rotated by the rotating means,
   wherein the support means for the disc cartridges comprises:
      a press member to contact with, and press a side of a first disc cartridge to hold a disc having a diameter of 12 cm and a second smaller disc cartridge of the at least two disc cartridges positioned on the tray;
      a holding member to hold both sides of the second smaller disc cartridge, to prevent movement of the second smaller disc cartridge positioned on the tray; and
      a horizontality member to maintain a horizontality of the second smaller disc cartridge with respect to a bottom of the tray.

16. The optical recording and/or reproducing apparatus as claimed in claim 15, wherein:
   the tray comprises a guide groove; and
   the press member comprises
      a press slider disposed on the tray, the press slider having a pair of hooks to be inserted into the guide groove of the tray,
      a pair of press portions integrally formed at first and second sides of the press slider, to press the side of the first disc cartridge,
      a pair of press rods movably disposed within respective inner sides of the press portions of the press slider, and linearly movable, the press rods to press a side of the second smaller disc cartridge positioned on the tray, and
      a pair of coil springs to elastically support the press rods toward initial positions, respectively.

17. The optical recording and/or reproducing apparatus as claimed in claim 15, wherein:
   the tray further comprises coupling holes formed at both middle sides thereof; and
   the holding member comprises
      a pair of holder brackets movably disposed at the coupling holes, respectively, to contact with opposite sides of the smaller disc cartridge positioned on the tray, wherein the holder brackets have guide pieces, and upper ends of the guide pieces are slanted to prevent interference occurring with a lower surface of the first disc cartridge.

18. The optical recording and/or reproducing apparatus as claimed in claim 15, wherein:
   the second smaller disc cartridge has a pair of insert holes;
   the tray further comprises a pair of piercing holes; and
   each of the horizontality members comprise:
      a bracket fixed to a lower surface of the tray,
      a bracket shaft movably disposed upward and downward on the bracket to selectively protrude through a corresponding one of the piercing holes so that the bracket shaft is inserted into the insert holes formed at a lower surface of the second smaller disc cartridge, and
      a coil spring to elastically support the bracket shaft upward.

19. An optical recording and/or reproducing apparatus to accommodate disc cartridges of at least two different sizes which receive respective discs of different sizes, comprising:
   a case;
   a tray mounted to the case and receivable into and withdrawable from the case, the tray selectively accommodating the disc cartridges;
   means for supporting the disc cartridges positioned on the tray according to sizes of the disc cartridges, so as to prevent movement of the disc cartridges on the tray;
   means for detecting from the disc cartridges the sizes of the disc cartridges positioned on the tray, and states of the respective discs accommodated in the disc cartridges;
   means for rotating the discs in the disc cartridges selectively positioned on the tray; and
   means for recording information on and/or reproducing the information from the discs rotated by the rotating means,
   wherein the respective discs accommodated in the disc cartridges each have a hub, and the optical recording and/or reproducing apparatus further comprises means for pressing the hubs of the discs accommodated in the disc cartridges, to chuck the discs onto the rotating means,
   the optical recording and/or reproducing apparatus further comprising:
      an upper cover coupled to an upper portion of the case;
      wherein the chucking means comprises
         a lever fixed to the upper cover, and having an end, and
         a clamper mounted on the end of the lever, to press hubs of the discs accommodated in the disc cartridges closely to the rotating means.

20. An optical recording and/or reproducing apparatus to accommodate first and second disc cartridges of different sizes, wherein the first and second disc cartridges hold first and second discs of different sizes, the optical recording and/or reproducing apparatus comprising:
   a case;
   a tray to selectively accommodate and maintain in place thereon the first and second disc cartridges of different sizes and being movable in a first direction;
   an optical pickup to selectively reproduce information stored on the first or second disc based upon which one of the first and second disc cartridges is mounted on the tray; and a detector to detect from the accommodated one of the first and second disc cartridges
the size of the accommodated one of the first and second disc cartridges, and
a state of the first and second discs accommodated in the accommodated one of the first and second disc cartridges,
the detector being movable in a second direction other than the first direction relative to the tray so as to detect the size and the state from the accommodated one of first and second disc cartridges.

21. The recording and/or reproducing apparatus as claimed in claim 20, wherein the tray is shaped to selectively accommodate the first and second discs without the corresponding first and second disc cartridges and an adapter which receives the second disc.

22. The recording and/or reproducing apparatus as claimed in claim 20, wherein the first disc has a diameter of 12 cm and the second disc has a diameter of 8 cm.

23. The optical recording and/or reproducing apparatus of claim 20, wherein said detector detects
which of the first or second disc cartridges is accommodated on the tray, and
states of the accommodated disc cartridge; and
wherein the optical pickup reproduces information stored on the accommodated disc based upon the detected state of the accommodated disc cartridge.

24. The optical recording and/or reproducing apparatus of claim 23, wherein the detected state comprises whether the respective disc has been exchanged and removed from within the corresponding one of the first and second disc cartridges.

25. The optical recording and/or reproducing apparatus of claim 23, wherein the detected state comprises whether the respective disc is single or double sided.

26. The optical recording and/or reproducing apparatus of claim 23, wherein the detected state comprises whether the respective disc has been formatted.

27. The optical recording and/or reproducing apparatus of claim 23, wherein
the tray further accommodates naked discs;
the detector further detects whether the tray is accommodating the naked discs.

28. The optical recording and/or reproducing apparatus of claim 27, wherein the detected state comprises whether the respective disc has been exchanged and removed from within the corresponding one of the first and second disc cartridges.

29. The optical recording and/or reproducing apparatus of claim 28, wherein the detected state comprises whether the respective disc is single or double sided.

30. The optical recording and/or reproducing apparatus of claim 29, wherein the detected state comprises whether the respective disc has been formatted.

31. An optical recording and/or reproducing apparatus to accommodate disc cartridges of at least two different sizes which receive respective discs of different sizes, comprising:
a case;
a tray mounted to the case and receivable into and withdrawable from the case in a first direction, the tray selectively accommodating the disc cartridges;
means for supporting the disc cartridges positioned on the tray according to the sizes of the disc cartridges, so as to prevent a movement of the disc cartridges on the tray;

first positioning means for determining a first position of a first disc cartridge of the at least two disc cartridges which holds a disc having a diameter of 12 cm on the tray and positioning the first disc cartridge at a predetermined position thereof;
first detecting means for detecting from the accommodated first disc cartridge a size of the first disc cartridge positioned by the first positioning means, and a state of the disc accommodated in the first disc cartridge;
second positioning means for determining a second position of a second smaller disc cartridge of the at least two disc cartridges which holds a disc having a diameter less than 12 cm on the tray and positioning the second smaller disc cartridge at a predetermined position thereof;
second detecting means for detecting from the accommodated second disc cartridge a size of the second smaller disc cartridge positioned by the second positioning means, and a state of the disc accommodated in the second smaller disc cartridge;
means for rotating the discs accommodated in the respective first and second smaller disc cartridges selectively positioned on the tray; and
means for recording information on and/or reproducing information from the discs rotated by the rotating means,
wherein one of the first and second detecting means moves relative to the tray in a second direction other than the first direction so as to detect from the accommodated first and second disc cartridges.

32. The optical recording and/or reproducing apparatus of claim 31, wherein the detected state comprises whether the respective disc has been exchanged and removed from within the corresponding one of the first and second disc cartridges.

33. The optical recording and/or reproducing apparatus of claim 31, wherein the detected state comprises whether the respective disc is single or double sided.

34. The optical recording and/or reproducing apparatus of claim 31, wherein the detected state comprises whether the respective disc has been formatted.

35. The optical recording and/or reproducing apparatus of claim 31, wherein
the tray further accommodates naked discs;
the means for supporting further supports the naked discs positioned on the tray; and further comprising a means for detecting whether the tray is accommodating the naked discs or the disc cartridges.

36. The optical recording and/or reproducing apparatus of claim 35, wherein the detected state comprises whether the respective disc has been exchanged and removed from within the corresponding one of the first and second disc cartridges.

37. The optical recording and/or reproducing apparatus of claim 36, wherein the detected state comprises whether the respective disc is single or double sided.

38. The optical recording and/or reproducing apparatus of claim 37, wherein the detected state comprises whether the respective disc has been formatted.

* * * * *

UNITED STATES PATENT AND TRADEMARK OFFICE
CERTIFICATE OF CORRECTION

PATENT NO.     : 6,538,971 B2
DATED          : March 25, 2003
INVENTOR(S)    : Young-sun Seo et al.

It is certified that error appears in the above-identified patent and that said Letters Patent is hereby corrected as shown below:

<u>Title page,</u>
Item [75], Inventors, "Hao-kook Choi" should be -- Han-kook Choi --.

Signed and Sealed this

Twenty-sixth Day of August, 2003

JAMES E. ROGAN
*Director of the United States Patent and Trademark Office*